(12) United States Patent
Kono

(10) Patent No.: US 7,271,939 B2
(45) Date of Patent: Sep. 18, 2007

(54) GAMMA CORRECTION METHOD, GAMMA CORRECTION APPARATUS, AND IMAGE READING SYSTEM

(75) Inventor: Takanobu Kono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 813 days.

(21) Appl. No.: 10/671,987

(22) Filed: Sep. 25, 2003

(65) Prior Publication Data

US 2004/0258323 A1 Dec. 23, 2004

(30) Foreign Application Priority Data

Sep. 25, 2002 (JP) ............................ P2002-279380

(51) Int. Cl.
*G06K 9/00* (2006.01)
*G06K 9/40* (2006.01)
*G06K 1/00* (2006.01)
*G03F 3/08* (2006.01)

(52) U.S. Cl. ...................... 358/519; 358/523; 358/525; 358/518; 358/1.9; 382/274; 382/167

(58) Field of Classification Search .................... None
See application file for complete search history.

(56) References Cited

U.S. PATENT DOCUMENTS

| | | | | |
|---|---|---|---|---|
| 4,853,795 A | * | 8/1989 | Morton et al. | 358/447 |
| 5,926,560 A | * | 7/1999 | Ichinose et al. | 382/162 |
| 5,937,088 A | * | 8/1999 | Hsu | 382/167 |
| 6,064,396 A | * | 5/2000 | Ouchi et al. | 345/604 |
| 6,700,561 B1 | * | 3/2004 | Christensen et al. | 345/97 |

* cited by examiner

*Primary Examiner*—Samir Ahmed
*Assistant Examiner*—Sean Motsinger
(74) *Attorney, Agent, or Firm*—John J. Penny, Jr.; Edwards Angell Palmer & Dodge LLP

(57) ABSTRACT

First, image data is converted using a first table storing conversion values in addresses corresponding to at least input values: u(k) represented by $u(k)=ab^{-k}$ (where a and b are constants and k is 0, 1, 2, ... m) of all input values and linear interpolation. Next, a second table storing conversion values set in response to the image data provided by conversion using the first table in addresses corresponding to at least input values: v(k) represented by $v(k)=ck+d$ (where c and d constants and k is 0, 1, 2, ... n) of all input values is stored in memory. Next, the image data provided by conversion using the first table is again converted using the second table and linear interpolation.

3 Claims, 11 Drawing Sheets

FIG. 5

| Interpolation range | 15 | 14 | 13 | 12 | 11 | 10 | 9 | 8 | 7 | 6 | 5 | 4 | 3 | 2 | 1 | 0 | ADDRESS |
|---|---|---|---|---|---|---|---|---|---|---|---|---|---|---|---|---|---|
| LOW-ORDER 11-BIT INTERPOLATION | 1 | 1 | 1 | 1 | 1 | | | | | | | | | | | | 1100_1111 |
| | 1 | 1 | 1 | 1 | 0 | | | | | | | | | | | | 1100_1110 |
| | 1 | 0 | 0 | 0 | 1 | | | | | | | | | | | | 1100_0001 |
| | 1 | 0 | 0 | 0 | 0 | | | | | | | | | | | | 1100_0000 |
| LOW-ORDER 10-BIT INTERPOLATION | 0 | 1 | 1 | 1 | 1 | 1 | | | | | | | | | | | 1011_1111 |
| | 0 | 1 | 0 | 0 | 0 | 0 | | | | | | | | | | | 1011_0000 |
| LOW-ORDER 9-BIT INTERPOLATION | 0 | 0 | 1 | 1 | 1 | 1 | 1 | | | | | | | | | | 1010_1111 |
| | 0 | 0 | 1 | 0 | 0 | 0 | 0 | | | | | | | | | | 1010_0000 |
| LOW-ORDER 8-BIT INTERPOLATION | 0 | 0 | 0 | 1 | 1 | 1 | 1 | 1 | | | | | | | | | 1001_1111 |
| | 0 | 0 | 0 | 1 | 0 | 0 | 0 | 0 | | | | | | | | | 1001_0000 |
| LOW-ORDER 7-BIT INTERPOLATION | 0 | 0 | 0 | 0 | 1 | 1 | 1 | 1 | 1 | | | | | | | | 1000_1111 |
| | 0 | 0 | 0 | 0 | 1 | 0 | 0 | 0 | 0 | | | | | | | | 1000_0000 |
| LOW-ORDER 6-BIT INTERPOLATION | 0 | 0 | 0 | 0 | 0 | 1 | 1 | 1 | 1 | 1 | | | | | | | 0111_1111 |
| | 0 | 0 | 0 | 0 | 0 | 1 | 0 | 0 | 0 | 0 | | | | | | | 0111_0000 |
| LOW-ORDER 5-BIT INTERPOLATION | 0 | 0 | 0 | 0 | 0 | 0 | 1 | 1 | 1 | 1 | 1 | | | | | | 0110_1111 |
| | 0 | 0 | 0 | 0 | 0 | 0 | 1 | 0 | 0 | 0 | 0 | | | | | | 0110_0000 |
| LOW-ORDER 4-BIT INTERPOLATION | 0 | 0 | 0 | 0 | 0 | 0 | 0 | 1 | 1 | 1 | 1 | 1 | | | | | 0101_1111 |
| | 0 | 0 | 0 | 0 | 0 | 0 | 0 | 1 | 0 | 0 | 0 | 0 | | | | | 0101_0000 |
| LOW-ORDER 3-BIT INTERPOLATION | 0 | 0 | 0 | 0 | 0 | 0 | 0 | 0 | 1 | 1 | 1 | 1 | 1 | | | | 0100_1111 |
| | 0 | 0 | 0 | 0 | 0 | 0 | 0 | 0 | 1 | 0 | 0 | 0 | 0 | | | | 0100_0000 |
| LOW-ORDER 2-BIT INTERPOLATION | 0 | 0 | 0 | 0 | 0 | 0 | 0 | 0 | 0 | 1 | 1 | 1 | 1 | 1 | | | 0011_1111 |
| | 0 | 0 | 0 | 0 | 0 | 0 | 0 | 0 | 0 | 1 | 0 | 0 | 0 | 0 | | | 0011_0000 |
| LOW-ORDER 1-BIT INTERPOLATION | 0 | 0 | 0 | 0 | 0 | 0 | 0 | 0 | 0 | 0 | 1 | 1 | 1 | 1 | 1 | | 0010_1111 |
| | 0 | 0 | 0 | 0 | 0 | 0 | 0 | 0 | 0 | 0 | 1 | 0 | 0 | 0 | 0 | | 0010_0000 |
| | 0 | 0 | 0 | 0 | 0 | 0 | 0 | 0 | 0 | 0 | 0 | 1 | 1 | 1 | 1 | 1 | 0001_1111 |
| NO INTERPOLATION | 0 | 0 | 0 | 0 | 0 | 0 | 0 | 0 | 0 | 0 | 0 | 0 | 0 | 0 | 0 | 1 | 0000_0001 |
| | 0 | 0 | 0 | 0 | 0 | 0 | 0 | 0 | 0 | 0 | 0 | 0 | 0 | 0 | 0 | 0 | 0000_0000 |

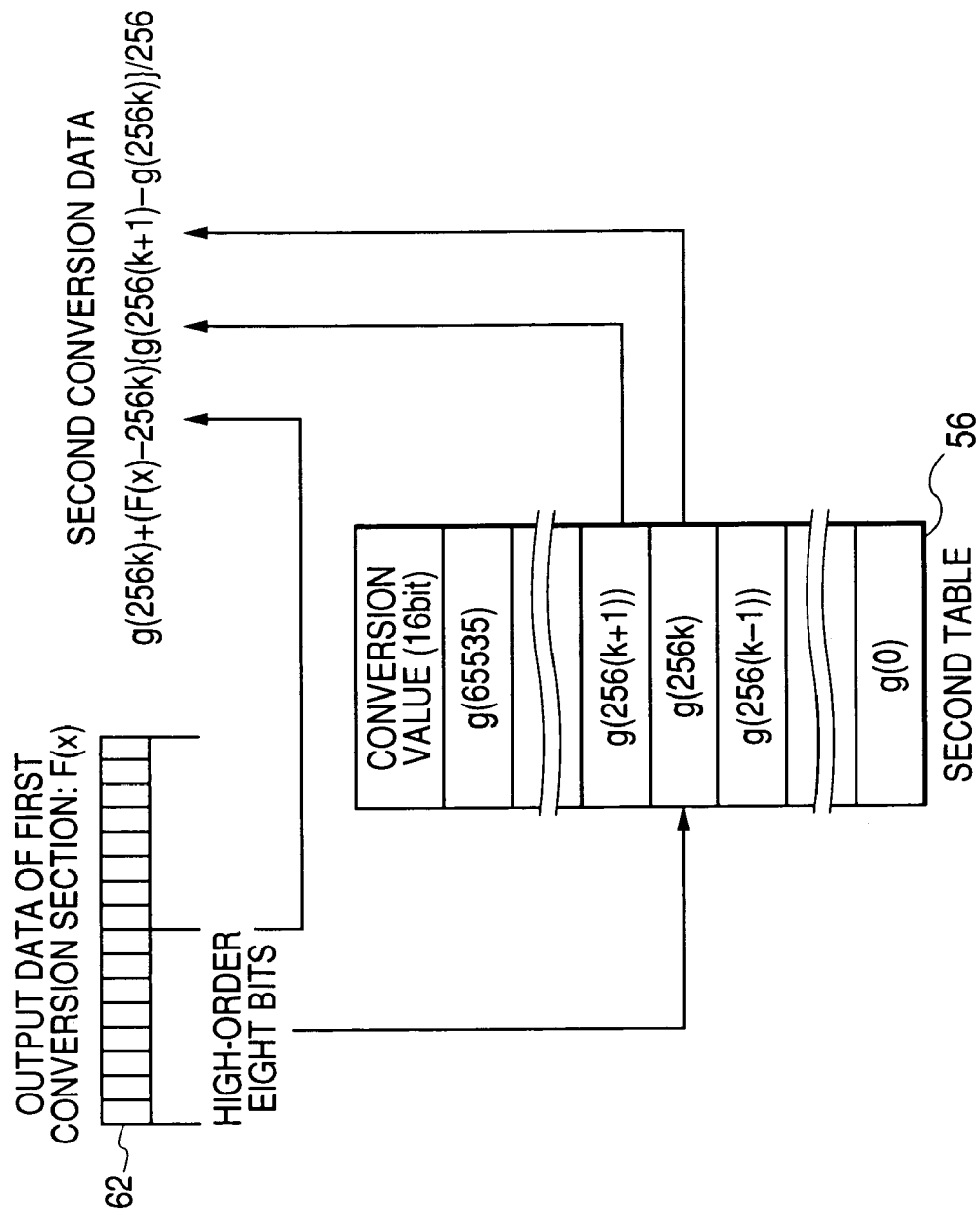

GAMMA CORRECTION METHOD, GAMMA CORRECTION APPARATUS, AND IMAGE READING SYSTEM

BACKGROUND OF THE INVENTION

This invention relates to a gamma correction method, a gamma correction unit, and an image read system.

Hitherto, to faithfully reproduce an input image as an output image, an image processing apparatus such as a scanner, a digital camera, a printer, or a display has made gamma correction so that γ of the whole from image input to final output becomes 1. γ is represented by the following expression wherein x is the input value and y is the conversion value:

$$y = x^{1/\gamma}$$ Expression 1

For example, an image read system for inputting an image from a scanner to a personal computer (PC) makes the following gamma correction:

First, in the scanner, an original is scanned at slow resolution and low-resolution image data is input. The low-resolution image data is gamma-corrected by an ASIC (application-specific integrated circuit) using a default LUT (look-up table) stored in ROM (read-only memory) of the scanner, and is transferred to the PC. The default LUT is read from the ROM of the scanner and is written into external SRAM etc., of the ASIC for use for the ASIC to make gamma correction. The default LUT is used tentatively before the nature of the image is determined.

Next, in the PC, an LUT to optimize gamma correction for the original is generated by a TWAIN driver based on the low-resolution image data transferred from the scanner.

Next, in the scanner, the LUT generated by the TWAIN driver is acquired from the PC and is written into main memory. The scanner combines the default LUT and the LUT generated by the TWAIN driver to create a new LUT by firmware, and writes the new created LUT into the external SRAM etc., of the ASIC.

Next, in the scanner, the original is scanned at high resolution and high-resolution image data is input. The high-resolution image data is gamma-corrected by the ASIC using the new LUT created by combining the LUTs, and is transferred to the PC. Consequently, the high-resolution image data subjected to the optimum gamma correction responsive to the original is input to the PC.

Generally, the LUT used for gamma correction requires the memory capacity responsive to the gradation of the image data before being gamma-corrected. Specifically, for example, if the image data before being gamma-corrected is a 16-bit gradation, a memory capacity of 65536 ($=2^{16}$) words is required. However, memory that can be random-accessed at high speed, such as SRAM generally used as memory of ASIC costs high per capacity, and the capacity that can be contained in the ASIC is limited due to the chip size; to externally connect the memory to the ASIC, the memory costs higher per capacity.

By the way, gamma correction is made using conversion using an LUT having a smaller number of conversion values than the number of gradation steps of input image data and linear interpolation in combination, whereby the data size of the LUT can be lessened.

However, a decrease in the data size of the LUT because of liner interpolation and the correction accuracy have trade-off relation and thus the data size of the LUT cannot much be lessened. Degradation in the correction accuracy caused by linear interpolation becomes noticeable particularly in a section in which fluctuation of change rate of the conversion value to the input value to the LUT is large. Therefore, for the image data input with a 16-bit gradation, a default LUT and an LUT generated by the TWAIN driver are combined to create an LUT of 4096 ($=2^{12}$) words, for example, and the image data is gamma-corrected using conversion with the LUT provided by combining the LUTS and linear interpolation of the low-order four bits in combination; the memory capacity required by the LUT is still large.

SUMMARY OF THE INVENTION

It is therefore an object of the invention to provide a gamma correction method, a gamma correction unit, and an image read system for decreasing the capacity of memory for storing a table used for correction while suppressing degradation of correction accuracy.

According to a first aspect of the invention, there is provided a gamma correction method including a first conversion step of converting image data using a first table storing conversion values in addresses corresponding to at least input values: u(k) represented by $u(k) = ab^{-k}$ (where a and b are constants and k is 0, 1, 2, ... m) of all input values and linear interpolation; a second table storing step of storing in memory a second table storing conversion values set in response to the image data provided at the first conversion step in addresses corresponding to at least input values: v(k) represented by $v(k) = ck + d$ (where c and d constants and k is 0, 1, 2, ... n) of all input values; and a second conversion step of converting the image data provided at the first conversion step using the second table and linear interpolation.

According to a second aspect of the invention, there is provided a gamma correction unit including memory storing a first table storing conversion values in addresses corresponding to at least input values: u(k) represented by $u(k) = ab^{-k}$ (where a and b are constants and k is 0, 1, 2, ... m) of all input values and linear interpolation; first conversion means for converting image data using the first table and linear interpolation; second table storing means for storing in the memory a second table storing conversion values set in response to the image data provided by the first conversion means for at least input values: v(k) represented by $v(k) = ck + d$ (where c and d are constants and k is 0, 1, 2, ... q) of all input values; and second conversion means for converting the image data provided by the first conversion means using the second table and linear interpolation.

According to the first or second aspect of the invention, the first table stores the conversion values for input value: $x(k) = ab^{-k}$ and thus has the conversion value corresponding to the input value relatively little by little as the input value is smaller and has the conversion value corresponding to the input value relatively in large steps as the input value is larger. Therefore, to make gamma correction based on the conversion characteristic that the conversion value change rate to the input value is large in the range in which the input values are small and is small in the range in which the input values are large as shown in FIG. 2, according to the first or second aspect of the invention, growing of a correction error caused by linear interpolation when the number of the conversion values in the first table is lessened can be suppressed. Thus, while degradation in the correction accuracy as the number of the conversion values in the first table is lessened is suppressed, the capacity of memory for storing the first table used for correction can be decreased.

According to the first or second aspect of the invention, the image data provided by conversion using the first table is again converted using the second table. Therefore, the conversion value in the second table is set appropriately, whereby the conversion characteristic defined in the first table and the second table can be set not only to the conversion characteristic shown in FIG. 2, but also to any desired conversion characteristic.

Further, the second table stores the conversion values for input values: $v(k)=ck+d$ and thus the image data provided by conversion using the first table can be converted uniformly. Therefore, the gradation of the conversion value in the first table and the number of the conversion values in the second table are set appropriately, whereby degradation in the correction accuracy in the whole correction in two steps using the two tables can be suppressed. That is, according to the first or second aspect of the invention, gamma correction can be made with good accuracy based not only on the conversion characteristic shown in FIG. 2, but also on any desired conversion characteristic.

Further, according to the first or second aspect of the invention, without combining the first and second tables, each table is referenced each time for conversion, so that the correction processing time can be shortened as much as the time required for processing of combining the first and second tables.

According to the first or second aspect of the invention, without combining the first and second tables, each table is referenced each time for conversion and thus the memory capacity required for LUT used for gamma correction becomes the sum of the capacities of the first and second tables. Therefore, the capacity of the first table and that of the second table are each lessened, whereby the memory capacity required for LUT used for gamma correction lessens. According to the first or second aspect of the invention, the capacity of the first table can be lessened, so that the memory capacity required for LUT used for gamma correction can be lessened.

According to a third aspect of the invention, there is provided an image read system including a scanning section for scanning an optical image and outputting image data representing the optical image, an optical system for inputting an optical image of an original to the scanning section, and a gamma correction unit according to the second aspect of the invention, characterized by setting means for causing the scanning section to output low-resolution image data, causing the first conversion means to convert the low-resolution image data output by the scanning section, and setting a conversion value in the second table in response to the low-resolution image data provided by the first conversion means; and conversion means for causing the scanning section to output high-resolution image data and causing the first conversion means and the second conversion means to convert the high-resolution image data output by the scanning section.

According to the image read system according to the third aspect of the invention, the second table is set in response to the low-resolution image data and the high-resolution image data is gamma-corrected using the first and second tables, so that the high-resolution image data subjected to the gamma correction based on the appropriate conversion characteristic responsive to the original can be output.

BRIEF DESCRIPTION OF THE DRAWINGS

In the accompanying drawings:

FIG. 5 is a table listing the correspondence between the addresses of a first conversion table and input values according to the embodiment of the invention.

FIG. 6 is a schematic representation to show processing of a second conversion section according to the embodiment of the invention.

DETAILED DESCRIPTION OF THE PREFERRED EMBODIMENTS

Referring now to the accompanying drawings, there is shown a preferred embodiment of the invention.

Figure 3:
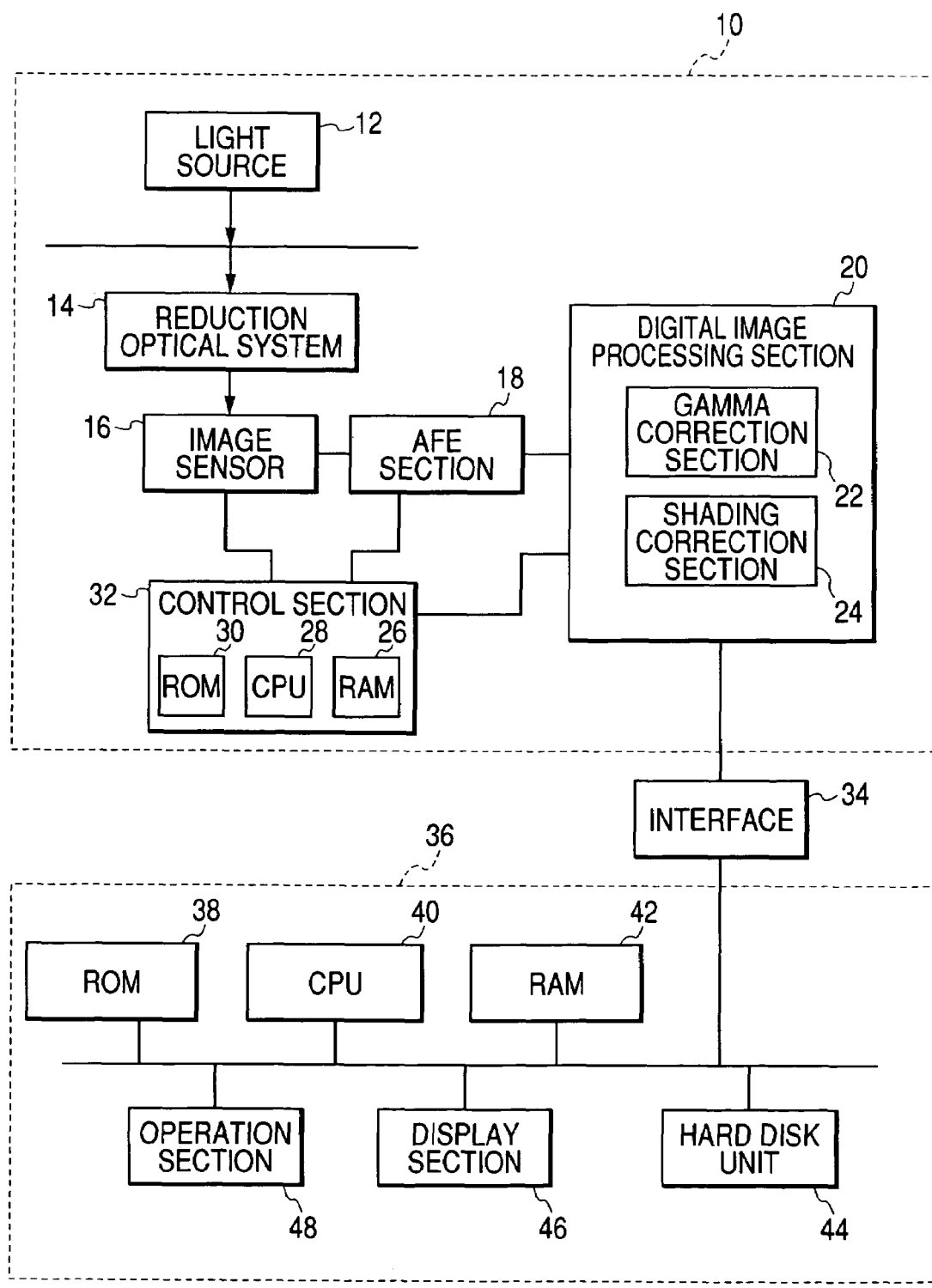
FIG. 3 is a block diagram to show an image read system according to the embodiment of the invention.

FIG. 3 is a block diagram to show an image read system according to one embodiment of the invention. The image read system according to the embodiment is made up of a scanner 10 and a PC 36 connected by an interface 34 such as a USB (universal series bus).

To begin with, the configuration of the PC 36 will be discussed.

A CPU 40 executes programs stored in ROM 38 and a hard disk unit 44 and controls the sections of the PC 36 and also executes a TWAIN driver stored in the hard disk unit 44 for controlling the scanner 10. The TWAIN driver causes the PC 36 to function as a part of setting means and a part of conversion means. The ROM 38 is memory previously storing the minimum program and data required for the CPU 40 to operate. RAM 42 is memory for temporarily storing various programs and various pieces of data. The hard disk unit 44 previously stores various programs and data such as the operating system and the TWAIN driver. An operation section 48 includes a pointing device such as a mouse, a keyboard, and the like for the user to enter an image read command. A display section 46 is made up of a dot-matrix display, a control circuit, VRAM (video RAM), etc., for displaying the image input from the scanner 10.

Next, the configuration of the scanner 10 will be discussed.

A light source 12 is implemented as a tube lighting unit such as a fluorescent tube lamp for applying light to an original. An optical system 14 is made up of a mirror and a lens. The optical system 14 forms a reflected light image of the original to which light is applied by the light source 12 on an image sensor 16 on a reduced scale. The light source 12 and the optical system 14 correspond to optical system as described in What Is claimed Is.

The image sensor 16 and an AFE section 18 correspond to scanning section as described in What Is claimed Is.

The image sensor 16 scans the optical image on the scanning line formed by the optical system 14 and outputs an electric signal corresponding to light and dark of the optical image. The image sensor 16 accumulates charges provided by performing photoelectric conversion of light of a predetermined wavelength area such as visible light, infrared light, or ultraviolet light on a light reception element such as a photodiode for a given time and outputs an electric signal responsive to the light reception amount for each light reception element using CCD (charge-coupled device), MOS transistor switch, etc.

The AFE (analog front end) section 18 is made up of an analog signal processing section, an A/D converter, and the like. The analog signal processing section performs analog signal processing of amplification, noise reduction processing, etc., for the electric signal output from the image sensor 16 and outputs the provided signal. The A/D converter quantizes the electric signal output from the analog signal processing section to a 16-bit digital representation signal and outputs the digital signal.

A control section 32 functioning as setting means and control means includes ROM 30, a CPU 28, RAM 26, and the like for controlling the sections of the scanner 10. The ROM 30 is memory previously storing firmware and data executed by the CPU 28. The firmware causes the control section 32 to function as a part of setting means and a part of conversion means. A first table 54 described later is previously stored in the ROM 30. The RAM 26 is memory for temporarily storing various programs and various pieces of data.

A digital image processing section 20 is an ASIC including a gamma correction section 22 as a gamma correction unit, a shading correction section 24, and the like. The digital image processing section 20 performs processing of gamma correction, interpolation of defective pixels according to pixel interpolation, shading correction, sharpening of image signal, and the like for the signal output from the AFE section 18 to create image data. The processing performed by the digital image processing section 20 may be replaced with processing of a computer program executed by the control section 32.

Figure 4:
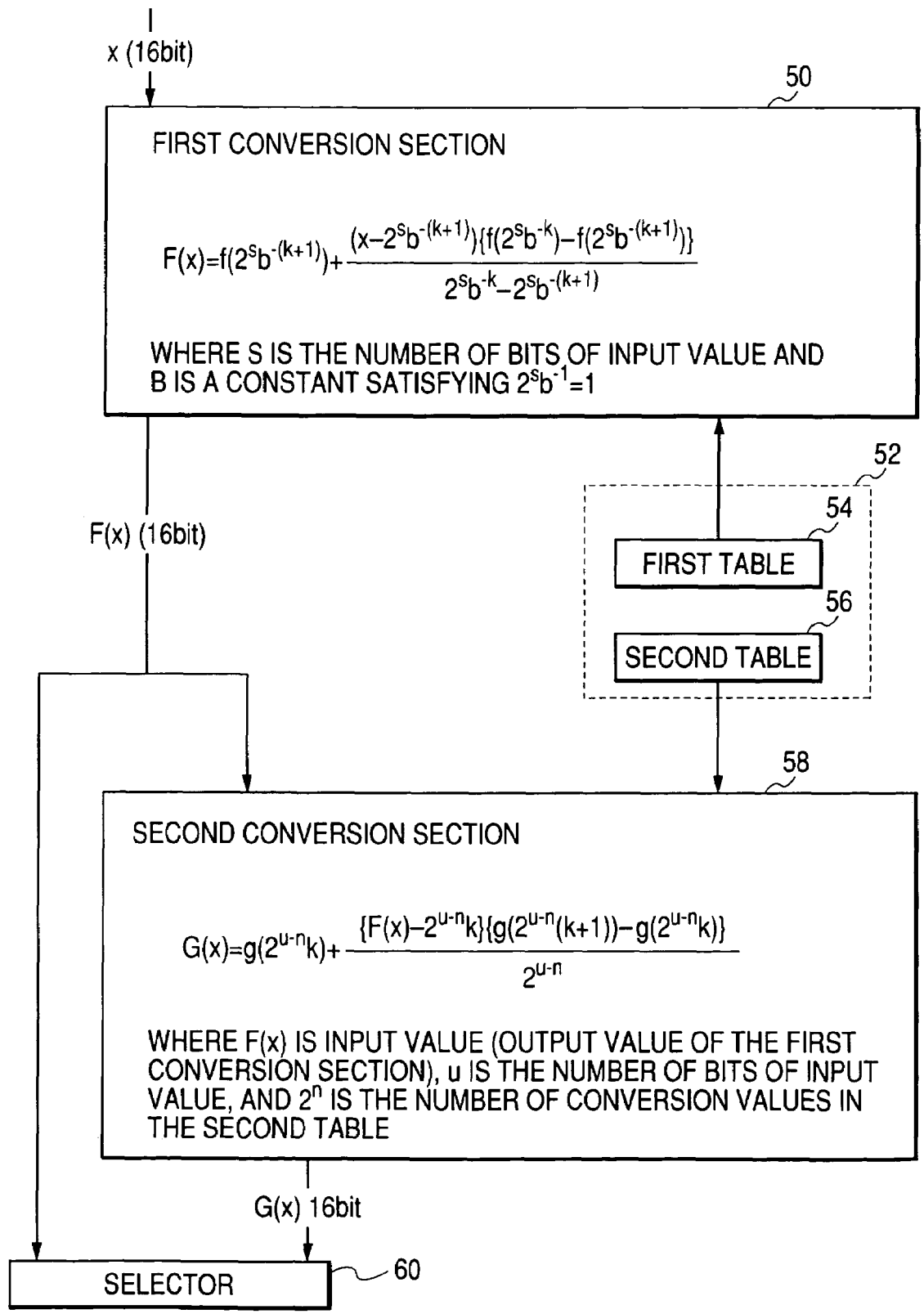
FIG. 4 is a block diagram to show the gamma correction section according to the embodiment of the invention.

FIG. 4 is a block diagram to show the gamma correction section 22. FIG. 1 is a schematic representation to show the processing of the gamma correction section 22.

A first conversion section 50 converts 16-bit gradation data: x output from the AFE section 18 into first conversion data: F(x) of 16-bit gradation based on a predetermined characteristic using the first table 54 stored in SRAM 52 and linear interpolation. The first table 54 is provided by storing data stored in the ROM 30 of the control section 32 in a predetermined address space of the SRAM 52 at the starting time. For color input, different first tables 54 become necessary in a one-to-one correspondence with the colors of R, G, and B. The SRAM 52 may be formed on the same board as the ASIC implementing the gamma correction section 22 or may be externally connected to the ASIC.

Figure 1A:
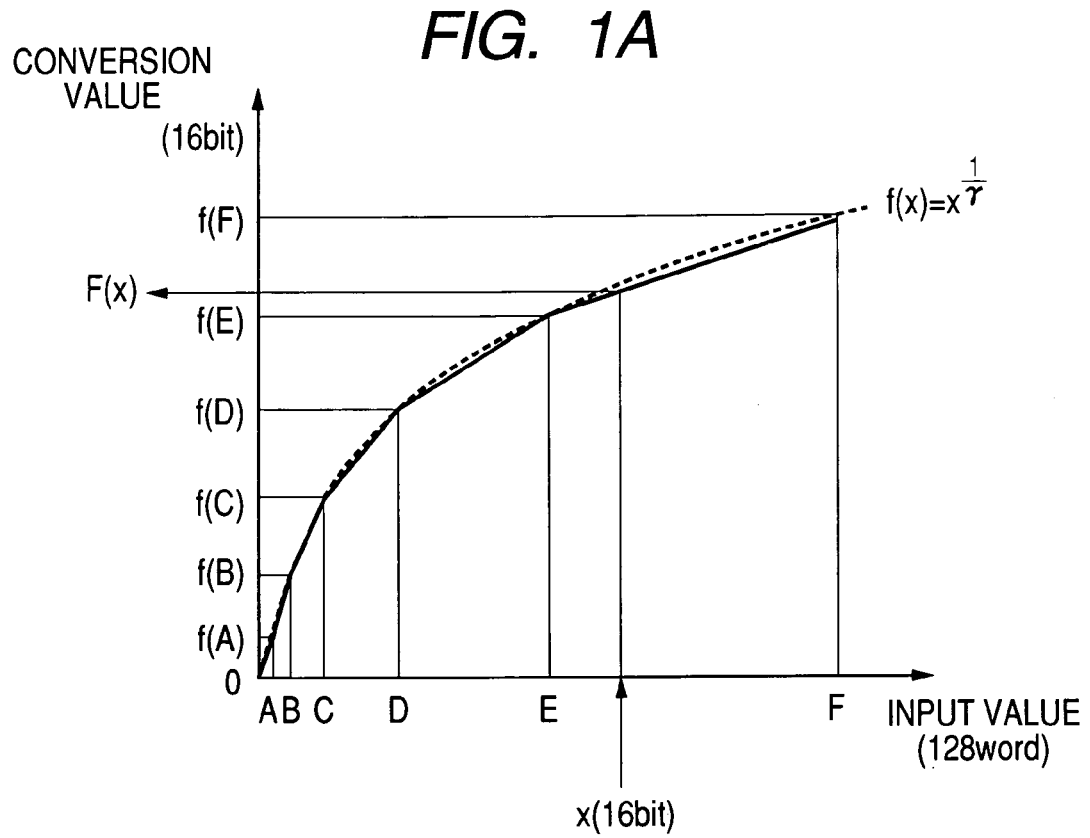
FIG. 1 is a schematic representation to show the processing of a gamma correction section according to one embodiment of the invention.
Figure 2A:
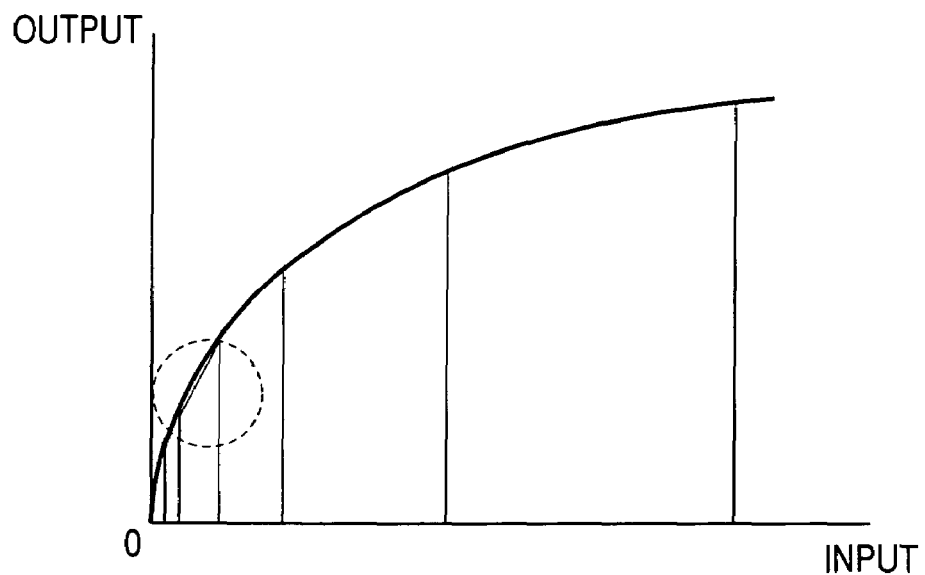
FIG. 2A is a graph to show an example of the conversion characteristic of gamma correction and FIG. 2B is an enlarged view of a part of the graph.
Figure 2B:
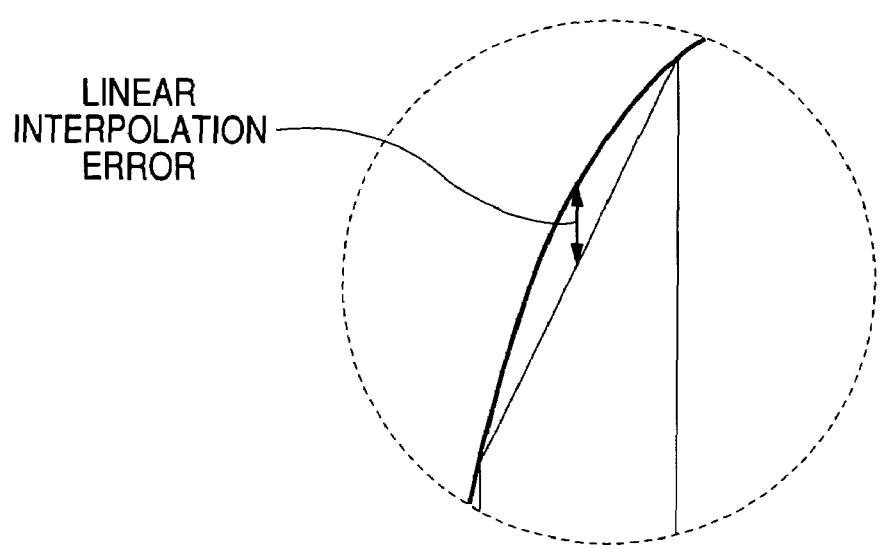

The first table 54 stores conversion values of 16-bit gradation in 128 addresses corresponding to input values: x represented by $2^s b^{-k}$ (where s is the number of bits of input value, k is 0, 1, 2, ... m, and m+1 is the number of words in the first table). The gradation and the number of the conversion values are not limited to them and can be set appropriately in response to the output gradation of the AFE section 18, the required correction accuracy, etc.; for example, the number of the conversion values can be set to 64, 208, 256, etc., and the gradation of the conversion value can be set to eight bits, 12 bits, etc. Assuming that the number of the conversion values in the first table 54 is set to 128 and the gradation of the conversion value is set to 16 bits, the 128 conversion values are assigned the 2048-bit ($128 \times 16 = 2^{11}$) capacity of the SRAM 52. The first table 54 stores conversion values f(x) of 16-bit gradation having the correlation of (Expression 1) described above with the input value: x in the 128 addresses corresponding to the input values: x. Preferably, γ has a conversion characteristic that the conversion value change rate to the input value is large in the range in which the input values are small and is small in the range in which the input values are large as shown in FIG. 2; preferably, specifically γ nearly equals 1.8, for example. FIG. 1(A) shows that conversion values of f(A) to f(F) are stored in the addresses corresponding to the input values A to F.

The first conversion section 50 finds F(x) represented by the following expression (expression 2) as follows:

$$F(x) = f(2^s b^{-(k+1)}) + \frac{(x - 2^s b^{-(k+1)})\{f(2^s b^{-k}) - f(2^s b^{-(k+1)})\}}{2^s b^{-k} - 2^s b^{-(k+1)}} \quad \text{Expression 2}$$

(where s is the number of bits of input value, b is a constant satisfying $2^s b^{-t} = 1$, and t+1 is the number of conversion values in the first table.)

First, two contiguous addresses of the first table 54 are found based on 16-bit gradation data output from the AFE section 18. That is, letting the data output from the AFE section 18 be x, the address previously associated with k satisfying the following expression and the next address are found:

$$2^s b^{-k} \geq x > 2^s b^{-(k+1)}$$

Here, the address associated with k is the address associated with the smallest input value (corresponding to F in FIG. 1A) exceeding the actual input value x of the input values previously associated with the addresses of the first table 54. The address associated with k+1 is the address associated with the largest input value (corresponding to E in FIG. 1A) not exceeding the actual input value x of the input values previously associated with the addresses of the first table 54. FIG. 5 is a table listing the correspondence between the input values and the addresses of the first table. FIG. 5 shows the correspondence between the input values of 16-bit gradation and the first table for storing 208 conversion values.

Next, the two address previously found are specified, two conversion values $f(2^s b^{-k})$ (corresponding to f(F) in FIG. 1A) and $f(2^s b^{-(k+1)})$ (corresponding to f(E) in FIG. 1A) are stored in a calculation register from the first table 54, and F(x) satisfying (Expression 2) is found, whereby linear interpolation of the first table 54 is performed. Accordingly, the first conversion data of 16-bit gradation corresponding to the input value x: F(x) is output from the first conversion section 50. The following expression (expression 3) is an expression provided by assigning the values shown in FIG. 1A to (expression 2):

$$F(x) = f(E) + \frac{(x-E)\{f(F) - f(E)\}}{F - E} \quad \text{[Expression 3]}$$

A second conversion section 58 converts 16-bit gradation data output from the first conversion section 50 into second conversion data of 16-bit gradation based on a predetermined characteristic using a second table 56 stored in the SRAM 52 and linear interpolation.

The control section 32 of the scanner 10 executes the firmware to generate the second table 56 based on an optimization table of eight-bit gradation found by a driver program executed in the PC 36 for controlling the scanner 10, and stores the second table 56 in the SRAM 52. The optimization table corresponds to a table generated by the driver program conforming to TWAIN based on low-resolution image data and downloaded into the scanner 10 from the PC 36. For color input, different optimization tables become necessary in a one-to-one correspondence with the colors of R, G, and B. The optimization table stores conversion values of eight-bit gradation in the addresses corresponding to x=k (where k=0, 1, 2, . . . , 255). The gradation and the number of the conversion values in the optimization table are not limited to them. The control section 32 executes the firmware to convert the eight-bit conversion value loaded into the RAM 26 into 16 bits and generate the second table 56 storing the conversion value g(x) of 16-bit gradation. The conversion is executed by multiplying the conversion value in the optimization table by 257, for example. The gradation of the conversion value in the second table 56 is not limited to 16 bits and may be set appropriately in response to the basic resolution of the scanner 10, etc. Assuming that the gradation of the conversion value in the second table 56 is set to 16 bits and the number of the conversion values is set to 256, the 256 conversion values in the second table 56 are assigned the 4096-bit ($256 \times 16 = 2^{12}$) capacity of the SRAM 52.

The second conversion section 58 finds G(x) represented by the following expression (expression 4) as follows:

$$G(x) = g(2^{u-n}k) + \frac{\{F(x) - 2^{u-n}k\}\{g(2^{u-n}(k+1)) - g(2^{u-n}k)\}}{2^{u-n}} \quad \text{Expression 4}$$

(where F(x) is the input value (output value of the first conversion section), u is the number of bits of the input value, and $2^n$ is the number of conversion values in the second table.)

Figure 1B:
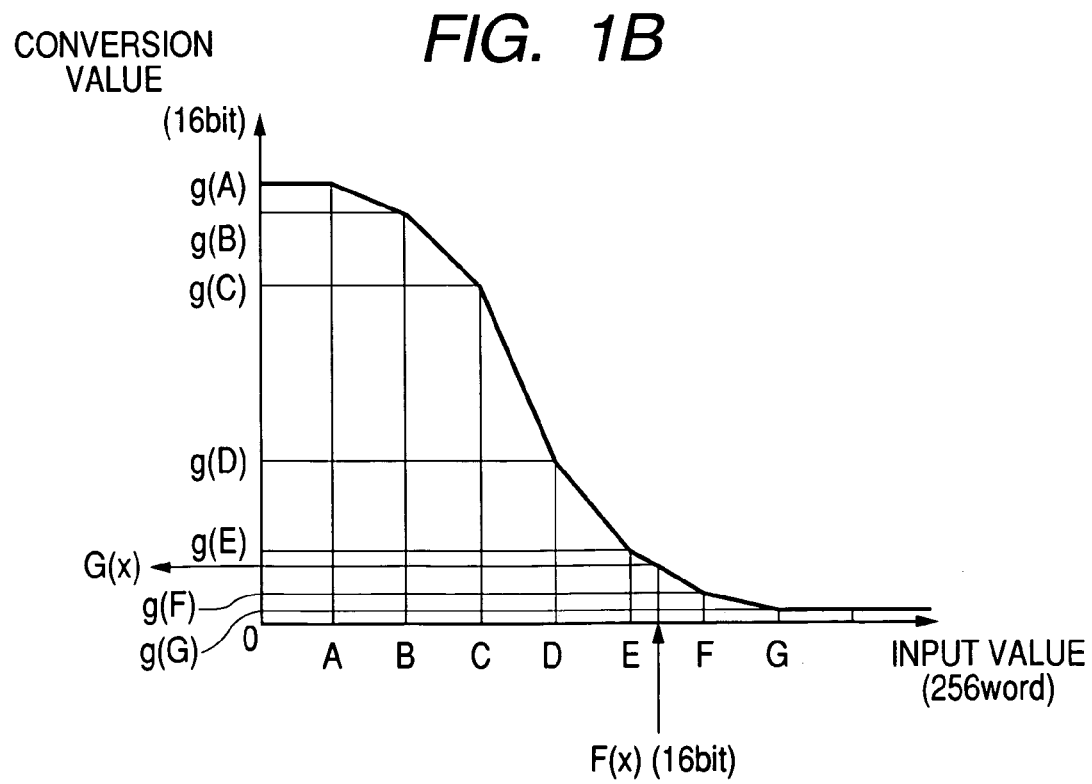

FIG. 1B and FIG. 6 are schematic representations to show the processing of the second conversion section 58.

First, two contiguous addresses of the second table 56 are found based on the high-order n-bits of a register 62 (n=8 in FIG. 1B and FIG. 6) for storing the output result of the first conversion section 50. That is, letting the data stored in the register 62 be x, the address previously associated with k satisfying the following expression and the next address are found (u=16 in FIG. 1B and FIG. 6):

$$2^{u-n}(k+1) \geq x > 2^{u-n}k$$

Next, the two address previously found are specified, two conversion values $g(2^{u-n}k)$ (corresponding to g(E) in FIG. 1B) and $g(2^{u-n}(k+1))$ (corresponding to g(F) in FIG. 1B) are stored in a calculation register from the second table 56, and G(x) satisfying (Expression 4) is found, whereby linear interpolation of the second table 56 is performed. Accordingly, the second conversion data of 16-bit gradation corresponding to the input value x: G(x) is output from the second conversion section 58. The following expression (expression 5) is an expression provided by assigning the values shown in FIG. 1B to (expression 4):

$$G(x) = g(F) + \frac{\{F(x) - E\}\{g(F) - g(E)\}}{F - E} \quad \text{Expression 5}$$

A selector 60 selects either the first conversion data output from the first conversion section 50 or the second conversion data output from the second conversion section 58 as output of the gamma correction section 22. Specifically, the selector 60 selects the first conversion data as output of the gamma correction section 22 at the prescanning time at which an image is input at low resolution and selects the second conversion data as output of the gamma correction section 22 when an image is input at high resolution following the prescanning.

Figure 7:
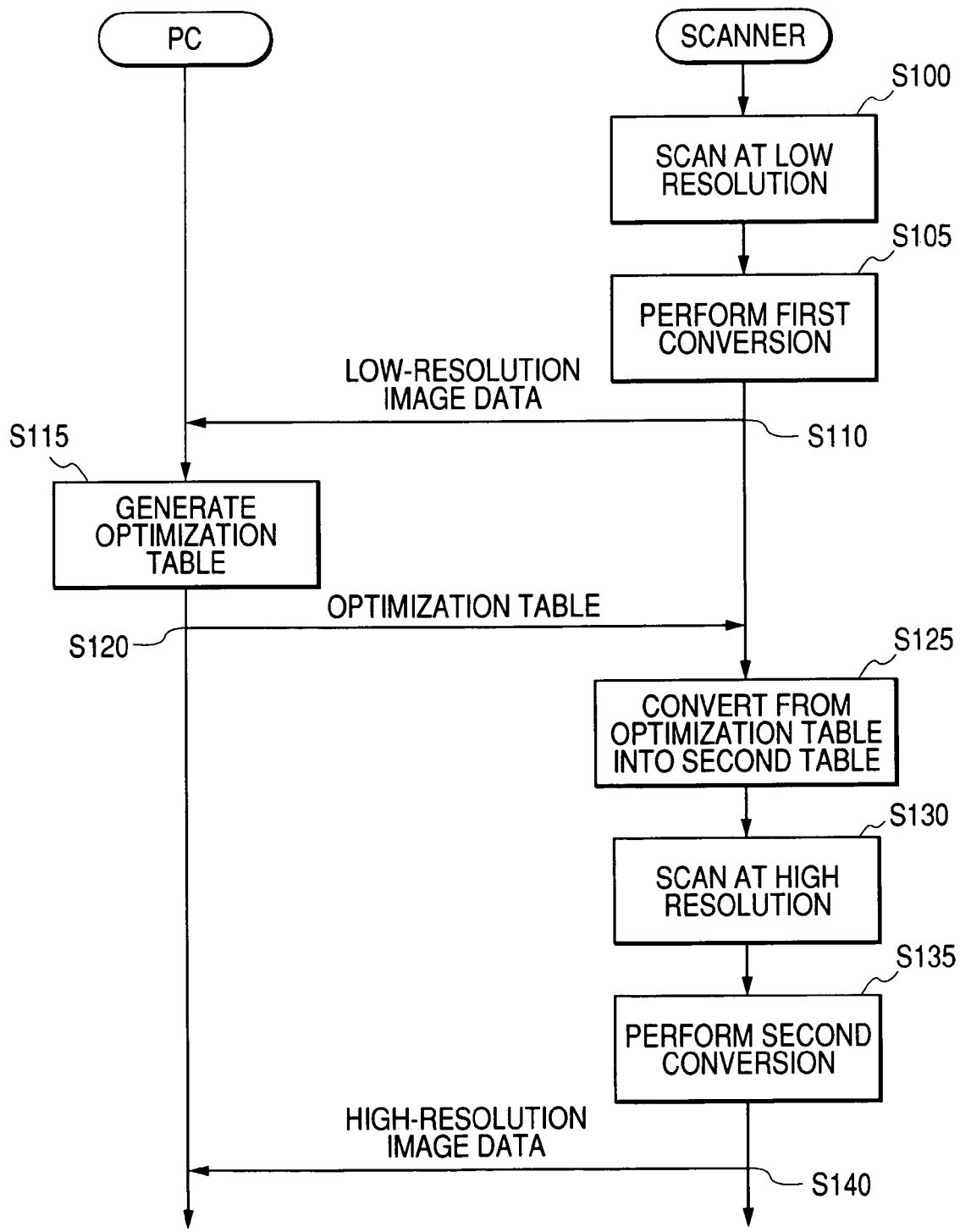
FIG. 7 is a sequence chart to show a flow of processing of inputting an image in the image read system according to the embodiment of the invention.

FIG. 7 is a sequence chart to show a flow of processing of inputting an image in the image read system according to the embodiment.

When a predetermined parameter is sent from the PC 36 to the scanner 10 and an original read command is given, the control section 32 of the scanner 10 controls the light source 12, the image sensor 16, the AFE section 18, etc., and inputs low-resolution image data to the digital image processing section 20 (S100).

Next, the control section 32 of the scanner 10 controls the digital image processing section 20 to output the first conversion data: F(x) generated based on the low-resolution image data and the first table 54 from the first conversion section 50 and cause the selector 60 to select the first conversion data: F(x). Consequently, the first conversion data generated by converting the low-resolution image data is output from the gamma correction section 22 (S105).

Next, the control section 32 of the scanner 10 controls the digital image processing section 20 to make shading correction, etc., to the first conversion data and send the low-resolution image data provided by making the shading correction through the interface 34 to the PC 36 (S110).

The PC 36 stores the low-resolution image data input through the interface 34 in the RAM 42 and executes the driver program conforming to TWAIN, thereby generating an optimization table responsive to the low-resolution image data, namely, an optimization table responsive to the original (S115) For the driver program conforming to TWAIN, the optimization table stores the eight-bit conversion values in the 256-word address space. The optimization table is generated based on the image data with lower resolution than the resolution to be finally input to the PC 36, whereby the data processing amount required for generating the optimization table can be decreased.

Next, the optimization table is sent from the PC 36 through the interface 34 to the scanner 10 (S120).

The scanner 10 stores the optimization table input through the interface 34 in the RAM 26 of the control section 32 and executes the firmware, thereby converting the conversion value in the optimization table into 16 bits, and stores a second table resulting from the converting in the SRAM 52 of the digital image processing section 20 (S125).

Next, the control section 32 of the scanner 10 controls the light source 12, the image sensor 16, the AFE section 18, etc., and inputs high-resolution image data to the digital image processing section 20 (S130).

Next, the control section 32 of the scanner 10 controls the digital image processing section 20 to output the first conversion data: F(x) based on the high-resolution image data and the first table 54 from the first conversion section 50 and further output the second conversion data: G(x) based on the first conversion data and the second table 56 from the second conversion section 58 and cause the selector 60 to select the second conversion data: G(x). Consequently, the second conversion data generated by converting the high-resolution image data is output from the gamma correction section 22 (S135).

Next, the control section 32 of the scanner 10 controls the digital image processing section 20 to make shading correction, etc., to the second conversion data and send the high-resolution image data provided by making the shading correction through the interface 34 to the PC 36 (S140).

Figure 8:
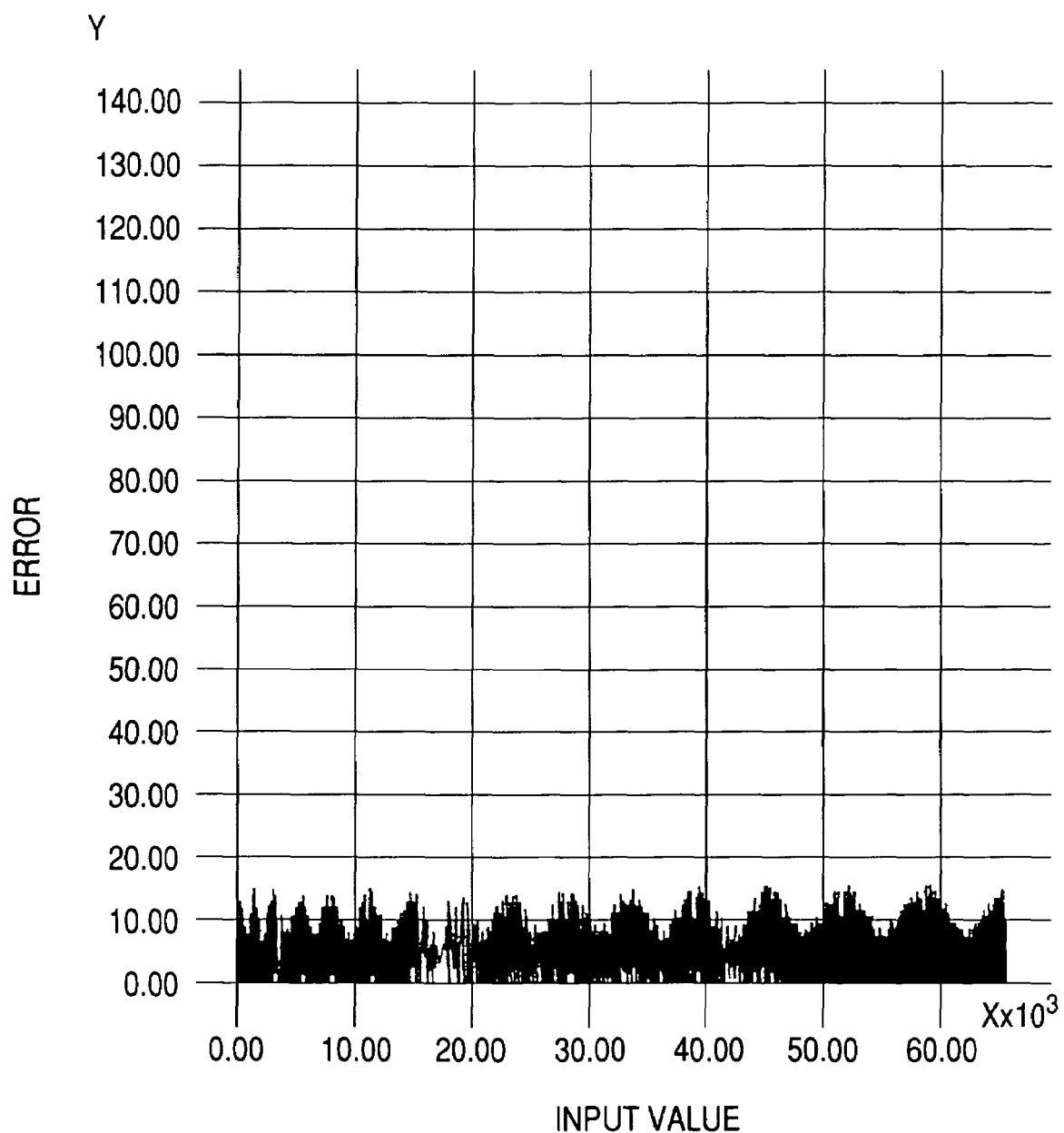
FIG. 8 is a graph to show the error between the correction value when an input value of 16-bit gradation is gamma-corrected to a conversion value of 16-bit gradation using a table storing 4096 conversion values of 16-bit gradation and linear interpolation and the theoretical correction value.
Figure 9:
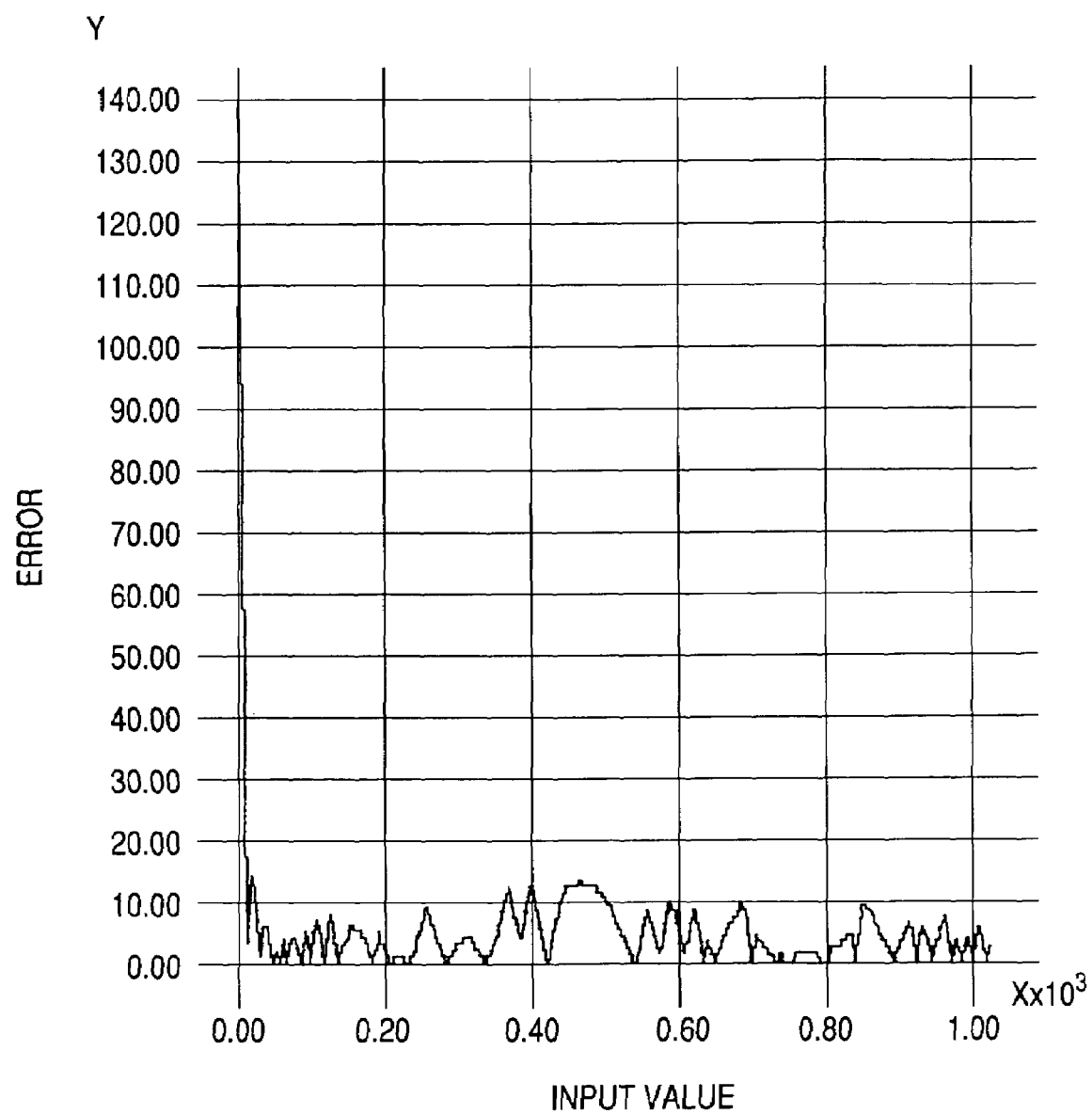
FIG. 9 is a graph of displaying a part in FIG. 8 on an enlarged scale.
Figure 10:
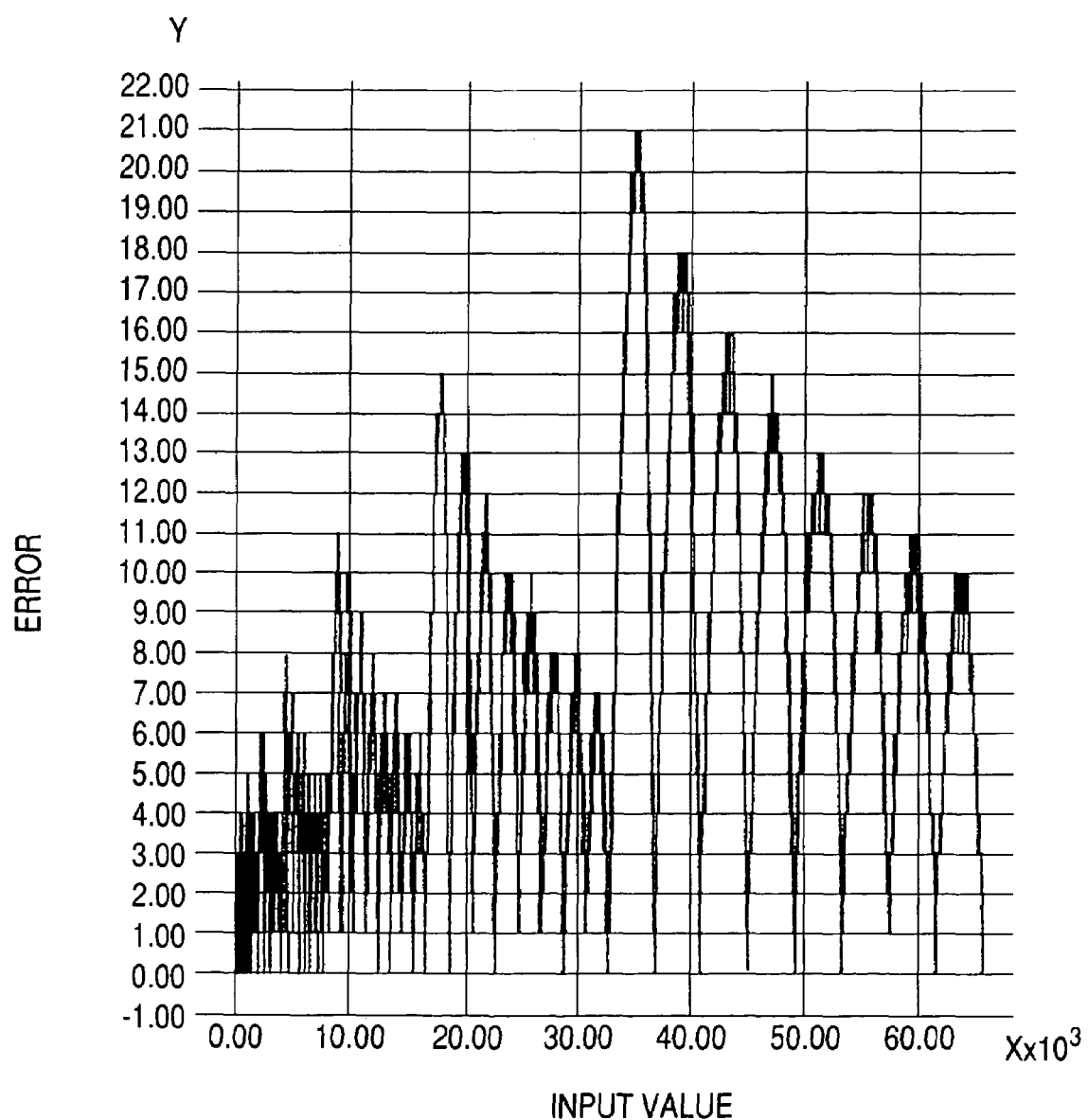
FIG. 10 is a graph to show the error between the correction value when an input value of 16-bit gradation is gamma-corrected to a conversion value of 16-bit gradation according to the embodiment of the invention using a first table having 128 conversion values of 16-bit gradation and a second table having 256 conversion values of 16-bit gradation and the theoretical correction value.
Figure 11:
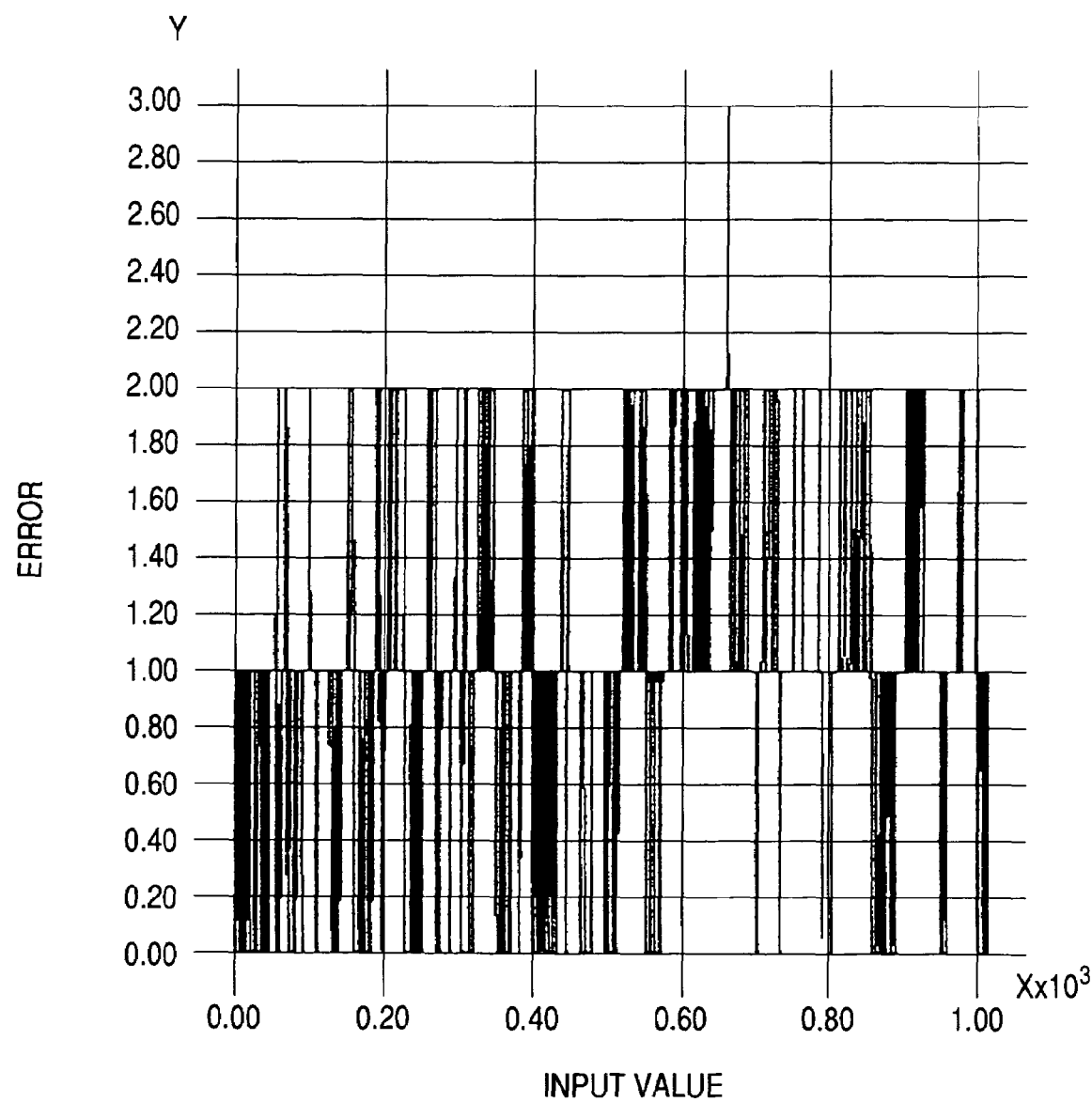
FIG. 11 is a graph of displaying a part in FIG. 10 on an enlarged scale.

The comparison and examination result of the error between the theoretical correction value in the gamma correction and the actual correction value about the described embodiment will be discussed below: FIG. 8 is a graph to show the error between the correction value when an input value of 16-bit gradation is gamma-corrected to a conversion value of 16-bit gradation using a table storing 4096 conversion values of 16-bit gradation and linear interpolation and the theoretical correction value as a comparison example. FIG. 9 is a graph of displaying a part in FIG. 8 on an enlarged scale. FIG. 10 is a graph to show the error between the correction value when an input value of 16-bit gradation is gamma-corrected to a conversion value of 16-bit gradation according to the embodiment of the invention using the first table 54 having 128 conversion values of 16-bit gradation and the second table 56 having 256 conversion values of 16-bit gradation and the theoretical correction value. FIG. 11 is a graph of displaying a part in FIG. 10 on an enlarged scale.

As shown in FIGS. 8 to 11, as compared with the comparison example, the error between the theoretical correction value and the actual correction value in the embodiment is considerably small in the range in which the input values are relatively small and a little large in the range in which the input values are relatively large and the increment of the error as a whole is minus or substantially ignorable plus.

On the other hand, making a comparison between the comparison example and the embodiment with respect to the memory capacity of the table used for the gamma correction, the memory capacity of 65536 (=16×496) bits is required in the comparison, while only the memory capacity of 6144 (=(128+256)×16) bits is required in the embodiment.

That is, according to the embodiment, while the accuracy of the gamma correction is maintained substantially at the same level as compared with the comparison example, the memory capacity of the table used for the gamma correction can be reduced to about one tenth.

According to the embodiment, creating of a new table by combining first and second tables is not executed and thus the data processing amount concerning the gamma correction can be decreased accordingly.

According to the embodiment, conversion using the second table is executed after conversion is executed using the first table, so that the conversion characteristic as a whole is not bound by the conversion characteristic of the first table and can be set as desired.

In the embodiment, the example of applying the invention to the image read system using the scanner and the PC in combination has been described, but the invention can also be applied to any other image processing system such as a copier.

What is claimed is:

1. A gamma correction method comprising:
a first conversion step of converting image data using a first table storing conversion values in addresses corresponding to at least input values $u(k)$ represented by $u(k)=ab^{-k}$ of all input values and linear interpolation, where a and b are constants and k is 0, 1, 2, ... m;
a second table storing step of storing in memory a second table storing conversion values set m response to the image data provided at the first conversion step in addresses corresponding to at least input values $v(k)$ represented by $v(k)=ck+d$ of all input values, where c and d constants and k is 0, 1, 2, ... n; and
a second conversion step of converting the image data provided at said first conversion step using the second table and linear interpolation.

2. A gamma correction unit comprising:
a memory that stores a first table storing conversion values in addresses corresponding to at least input values $u(k)$ represented by $u(k)=ab^{-k}$ of all input values and linear interpolation, where a and b are constants and k is 0, 1, 2, ... m;
first conversion unit that converts image data using the first table and linear interpolation;
second table storing unit that stores in the memory a second table storing conversion values set in response to the image data provided by said first conversion unit for at least input values $v(k)$ represented by $v(k)=ck+d$ of all input values, where c and d are constants and k is 0, 1, 2, ... q; and
second conversion unit that converts the image data provided by said first conversion unit using the second table and linear interpolation.

3. An image read system comprising:
a scanning section that scans an optical image and outputs image data representing the optical image;
an optical system that inputs an optical image of an original to the scanning section;
a gamma correction unit including,
   a memory that stores a first table storing conversion values in addresses corresponding to at least input values $u(k)$ represented by $u(k)=ab^{-k}$ of all input values and linear interpolation, where a and b are constants and k is 0, 1, 2, ... m,
   a first conversion unit that converts image data using the first table and linear interpolation,
   a second table storing unit that stores in the memory a second table storing conversion values set in response to the image data provided by the first conversion unit for at least input values $v(k)$ represented by $v(k)=ck+d$ of all input values, where c and d are constants and k is 0, 1, 2, ... q, and
   a second conversion unit that converts the image data provided by the first conversion unit using the second table and linear interpolation;
a setting unit that causes the scanning section to output low-resolution image data, causing the first conversion unit to convert the low-resolution image data output by the scanning section, and setting a conversion value in the second table in response to the low-resolution image data provided by the first conversion unit; and
a conversion unit that causes the scanning section to output high-resolution image data and causes the first conversion unit and the second conversion unit to convert the high-resolution image data output by the scanning section.

* * * * *